United States Patent
Talvitie et al.

(10) Patent No.: US 11,815,975 B2
(45) Date of Patent: Nov. 14, 2023

(54) DEVICES WITH REMOVABLE SMART CARDS

(71) Applicant: Nordic Semiconductor ASA, Trondheim (NO)

(72) Inventors: Hannu Talvitie, Trondheim (NO); Marko Winblad, Trondheim (NO); Veli-Pekka Junttila, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 463 days.

(21) Appl. No.: 16/982,861

(22) PCT Filed: Mar. 22, 2019

(86) PCT No.: PCT/EP2019/057344
§ 371 (c)(1),
(2) Date: Sep. 21, 2020

(87) PCT Pub. No.: WO2019/180262
PCT Pub. Date: Sep. 26, 2019

(65) Prior Publication Data
US 2021/0055773 A1    Feb. 25, 2021

(30) Foreign Application Priority Data
Mar. 22, 2018  (GB) .................................. 1804626

(51) Int. Cl.
*G06F 1/32*        (2019.01)
*G06F 1/3234*      (2019.01)
(Continued)

(52) U.S. Cl.
CPC ......... *G06F 1/325* (2013.01); *G06K 19/0701* (2013.01); *H04L 9/32* (2013.01); *H04W 8/18* (2013.01); *G06F 1/3203* (2013.01)

(58) Field of Classification Search
CPC ... G06F 1/325; G06F 1/3287; G06K 19/0701; H04L 9/32; H04W 8/18; H04W 8/183;
(Continued)

(56) References Cited

U.S. PATENT DOCUMENTS 9,755,373 B2 * 9/2017 Tang .................... H01R 13/703
10,909,524 B2 * 2/2021 Van Os ................ G06Q 20/401
(Continued)

FOREIGN PATENT DOCUMENTS

| EP | 2 836 052 A1 | 2/2015 |
| WO | WO 2017/201931 A1 | 11/2017 |
| WO | WO 2017/201966 A1 | 11/2017 |

OTHER PUBLICATIONS

IPO Search Report under Section 17(5) for Great Britain Application No. GB1804626.8, dated Sep. 25, 2018, 3 pages.
(Continued)

*Primary Examiner* — Volvick Derose
(74) *Attorney, Agent, or Firm* — Klarquist Sparkman, LLP

(57) ABSTRACT

A method of controlling an electronic device including a memory and a removable smart card. The method involves the device sending a request for context data to the smart card. The smart card sends context data to the device in response to the request and stores this data in the memory and power to the smart card is reduced. Power to the smart card is then increased or restored, and the data is written back to the smart card.

15 Claims, 3 Drawing Sheets

(51) Int. Cl.
*G06K 19/07* (2006.01)
*H04L 9/32* (2006.01)
*H04W 8/18* (2009.01)
*G06F 1/3203* (2019.01)

(58) Field of Classification Search
CPC ......... H04W 52/0229; H04W 52/0235; H04W 52/0216; Y02D 10/00; Y02D 30/70
USPC ....................................................... 713/320
See application file for complete search history.

(56) References Cited

U.S. PATENT DOCUMENTS

| | | | | |
|---|---|---|---|---|
| 2007/0251997 | A1* | 11/2007 | Brown | G06K 7/0008 235/380 |
| 2008/0086758 | A1* | 4/2008 | Chowdhury | G07C 9/27 726/4 |
| 2008/0224825 | A1* | 9/2008 | Nystrom | H04W 52/0241 455/41.1 |
| 2012/0083315 | A1* | 4/2012 | Kawakishi | H04W 4/60 455/558 |
| 2012/0234927 | A1* | 9/2012 | Poidomani | G06K 19/0702 235/492 |
| 2012/0235787 | A1* | 9/2012 | Brient | H04M 1/72412 340/5.61 |
| 2015/0044964 | A1* | 2/2015 | Khan | G06F 21/606 455/41.1 |
| 2015/0067351 | A1* | 3/2015 | Wang | H04W 12/082 713/189 |
| 2016/0350564 | A1* | 12/2016 | Nedelcu | G16H 40/67 |
| 2017/0311160 | A1* | 10/2017 | Feng | H04B 5/0031 |
| 2019/0208471 | A1* | 7/2019 | Wu | H04W 52/0229 |
| 2019/0261270 | A1* | 8/2019 | Wu | H04W 52/0212 |
| 2021/0334116 | A1* | 10/2021 | Kaplan | G06F 3/0482 |
| 2022/0382840 | A1* | 12/2022 | Weston | G06V 40/30 |

OTHER PUBLICATIONS

International Search Report and Written Opinion for PCT/EP2019/057344, dated Jun. 4, 2019, 14 pages.
ETSI TR 131 970 v14.0.0 (Jun. 2017) Technical Report, Universal Mobile Telecommunications System (UMTS); LTE UICC power optimisation for Machine-Type Communication (3GPP TR 31.970 version 14.0.0 Release 14), Jun. 2017, 16 pages.

* cited by examiner

DEVICES WITH REMOVABLE SMART CARDS

CROSS REFERENCE TO RELATED APPLICATIONS

This is the U.S. National Stage of International Application No. PCT/EP2019/057344, filed Mar. 22, 2019, which was published in English under PCT Article 21(2), which in turn claims the benefit of Great Britain Application No. 1804626.8, filed Mar. 22, 2018.

TECHNICAL FIELD

The present invention relates to devices which may be connected to a removable smart card, such as a Universal Integrated Circuit Card (UICC) running a Subscriber Identification Module (SIM) application, and to methods of controlling such devices.

BACKGROUND

Currently, the use of a smart card such as a Universal Integrated Circuit Card (UICC) in a device is typical for applications such as mobile phones, or other cellular-enabled devices. A UICC typically comprises a CPU, and a small amount of memory. Due to the high demand for very low cost UICCs, the components such as the CPU inside the UICC are very limited in terms of speed/efficiency. Applications such as a Subscriber Identification Module (SIM) application may be run on a UICC, to allow the device connected to the UICC to communicate with a cellular network. This allows for the long range transfer of data from a mobile/remote device, without need for connections such as direct wiring, Wi-Fi, Bluetooth etc., which are all limited by range or practicality. Devices comprising a UICC are becoming increasingly common in the modern age as the Internet of Things (IoT) becomes prevalent.

An example of such an IoT enabled device is an environmental sensor, used as a part of a wide sensor network, for monitoring the conditions of a location or area of land. Such a device may record a measurement, for example, a few times a day, and store the data on the device. The device may then communicate the data to the network at a rate of, for example, once per day. The device may also remain awake for a short period of time after a measurement/transmission cycle to receive any messages that may have been sent to it. Such a device may enter a low power, or sleep state during periods of time when the device is not making measurements or communicating with the network, in order to conserve power. As the advantage of such devices is their portability and remote location, connection to a constant power source is typically not viable; the devices are thus usually battery powered.

However, during a low power or sleep state as mentioned above, the device still consumes power. This consumption may arise from, for example, a timer counting when to next wake the device up for a measurement or communication period, or the UICC power supply. Minimisation of this power consumption is key to increasing the battery lifespan of the devices described.

It is known to power a UICC in a 'clock stop mode' during periods of desired low power consumption, however even in this state, a UICC consumes a non-negligible amount of power (e.g. 15 µA). Over a long period of time, for example months or years, this idle power consumption can accumulate, limiting the lifetime of a battery powered device. In applications with such remote sensors as those described above, it will be appreciated that regular replacement of batteries is not desirable.

It has been suggested, for example in ETSI TR 131970 V14.0.0, to power down the UICC when the device enters a sleep state. This allows for significantly reduced power consumption during periods of time when the UICC is not required. However, this approach has various drawbacks. Firstly, the device is required to re-initialize the UICC when power is restored, which requires a significant current draw and can take a significant amount of time. Secondly, the UICC would lose its context, which could have potential impacts on the applications running on the UICC at the time. The use of 'context' here will be understood to be any information relating to the current state of the UICC and/or any application or process it is currently running. Specifically, context data may include, but is not limited to, one or more of: the status of selected Network Access Applications (NAAs) on each logical channel, security conditions for each NAA, selected Elementary Files (EFs) and record for each logical channel, status of toolkit applications etc. In order to mitigate these problems, a solution has been proposed that is known as a SUSPEND/RESUME cycle.

A SUSPEND operation involves the UICC generating resume information, together with full status information and storing it in its non-volatile memory. This information is colloquially referred to herein as 'context data'. As a UICC is limited in size and cost, its functionality and processing power is also limited. Due to this limited processing capability, it is noted that this SUSPEND operation may take a significant amount of time.

A RESUME operation involves restoring the status of the UICC that was previously stored to non-volatile memory. This essentially involves re-initialization of the UICC, followed by reapplication of the status of the UICC. Once again, due to the limited processing capabilities of a UICC, it is noted that this RESUME operation may take a significant amount of time. These significant durations of operation further increase the time that the UICC is required to be powered for a specific function. This, in turn, increases the overall power requirement, decreasing the battery life of a device.

SUMMARY

When viewed from a first aspect the present invention provides a method of controlling an electronic device comprising a memory and a removable smart card connected thereto, the method comprising:
  the device sending a request for context data to the smart card;
  the smart card sending context data to the device in response to the request;
  storing the received context data in the memory;
  reducing or removing power to the smart card; and
  subsequently increasing or restoring power to the smart card and writing the context data back to the smart card.

The invention extends to an electronic device adapted for use in the above method and therefore when viewed from a second aspect the present invention provides an electronic device comprising a memory and a removable smart card connected thereto, the device being arranged to:
  send a request for context data to the smart card;
  receive context data from the smart card in response to the request;
  store the received context data in the memory;
  reduce or remove power to the smart card; and subsequently increase or restore power to the smart card and write the context data back to the smart card.

Devices such as those described above are often sold independently of the smart cards that they are adapted to receive. Therefore, the invention also extends to an electronic device comprising a memory, and being adapted to receive a smart card, the device being arranged in use to:
send a request for context data to the smart card;
receive context data in response to the request;
store the received context data in the memory;
reduce or remove power to the smart card; and
subsequently increase or restore power to the smart card and write the context data back to the smart card.

The invention also extends to a non-transitory computer readable medium comprising software for execution on an electronic device comprising a memory and a removable smartcard connected thereto, the software comprising instructions to:
send a request for context data to the smart card;
receive context data from the smart card in response to the request;
store the received context data in the memory;
reduce or remove power to the smart card; and
subsequently increase or restore power to the smart card and write the context data back to the smart card.

Thus it will be seen by those skilled in the art that in accordance with the present invention an electronic device comprising a memory and a removable smart card can reduce or remove power to the smart card during periods of desired low power consumption. Whilst it is envisaged that in some applications the card may still require a small amount of background current, preferably all power is removed from the smart card. The smart card may not be required during these low power states, and thus there is no need to power/fully power it. Reducing or removing the power to the smart card at such times may result in lower overall power consumption.

However, by saving context data from the smart card on the device, and later writing it back, the smart card can resume its operation quickly and efficiently making use of the device's superior in-built processing capabilities, rather than such resources needing to be provided by the smart card itself. This reduces the amount of time that the smart card is required to be powered, further reducing the total power consumption of the device. The only processes that may be required by the smart card are those of compiling the context data and making it available to the device. The process of writing the context data to the non-volatile memory of the smart card may be avoided, and thus, the time required to complete the process may be reduced. A further benefit may be that a relatively inexpensive, simple smart card can still be used to achieve the desired power savings. No new smart card hardware is required for embodiments of the invention to function. Furthermore, the proposed solution may obviate any potential life-time issues with the UICC non-volatile internal memory.

In a set of embodiments, the smart card is a Universal Integrated Circuit Card. The smart card being a UICC means that the device's internal structure and programming can be simplified to support the standard shape and electronic interface associated with a UICC. This provides various benefits to the device designers, such as time saved, reduced code overhead (resulting from only requiring a single interface), conformity to international standards etc.

In a set of embodiments, the smart card runs a Subscriber Identification Module application. In these embodiments, the device is enabled to communicate with a cellular network. Provided the device has the required hardware, this permits the wireless transfer of data to and from the network. In applications such as remote sensor networks, a single device can transmit its sensor's data to the network, which can then be downloaded on a different device elsewhere, or uploaded to the internet. The device may also receive data from other devices through the network. This allows for wireless updates to device firmware/software, specific control of a single device if so required, or otherwise general transmission of data to the device.

In a set of embodiments, the device memory is non-volatile memory. By storing the context data in non-volatile memory, the device can retain the data in the case of a reduction of power to the memory. This may be planned, or unplanned. In the case of a planned power reduction to the memory, the device can reduce overall power consumption by reducing power to the memory during periods of time when it is not required. The power to the memory can later be increased when needed, and the context data will still be stored there. In the case of an unplanned power reduction, the valuable context data will still be stored upon restoring power to the memory. In a set of embodiments, the method further comprises the device going into a sleep mode after reducing or removing power to the smart card. By entering a sleep mode after reducing or removing power to the smart card, the device can reduce its power consumption greatly. This has various benefits. For example, as devices in accordance with the invention may be battery powered, the reduction of overall power consumption results in extended battery lifespan. For devices in, for example, remote locations such as individual sensors of a network, replacement of batteries is not easy/feasible. Increased battery life can therefore greatly improve the performance lifetime and desirability of such devices. It has been noted by the inventors that despite the increased current demand that arises from initialising a smart card from an off or reduced power state, the overall current supplied to the smart card over time may be reduced when compared to maintaining the smart card power supply during a sleep/low power period of the device. This advantage is most applicable in the context of devices that only require infrequently waking up, as the power savings when the smart card has a reduced/no power supply accumulate over time.

In a set of embodiments, the smart card encrypts the context data before sending it to the device. In some examples, the context data may contain sensitive information. It is therefore an object of the invention to protect this information from a hacker or otherwise unauthorised individual. Before transferring the context data, the smart card may encrypt it through a standard data encryption method e.g. AES, RSA etc. Once the context data has been transferred from the smart card, it can not be read in any meaningful way by the device or another individual.

In a set of further embodiments, the device creates a random tag that is used in the encryption of the context data. This could, for example, be sent to the smart card with the request for context data. By associating a random tag that is generated on the device with the encryption of the context data, the smart card can verify the identity of the device upon later receiving the context data. This protects the scenario in which an individual attempts to bypass a protection mechanism on the smart card, for example, a PIN verification of the smart card which is required on re-initialization, by removing the smart card from the original device, and attempting to re-initialize it on a second device.

In a set of embodiments, the smart card calculates a Hash Message Authentication Code of the context data. The smart card may calculate a Hash Message Authentication Code (HMAC) of the context data with a secret key that is generated on the device, or on the smart card itself.

In a set of embodiments, the smart card verifies the validity of the context data written back to it after power has been increased or restored. By verifying the validity of the context data, the smart card can ensure that the context data has not been modified by the device, or an individual wishing to manipulate the smart card in some way. In verifying the context data, the smart card may verify both the data integrity of the context data, and also the authentication of the data. This ensures that the data itself has not been modified, and that the data has been sent from the original device that the smart card sent the context data to. This verification may take place by, for example, comparing the terminal-originated tag with the tag that was originally associated with the context data, or by calculating another HMAC of the data packet.

In a set of embodiments, the smart card decrypts the context data written back to it after power has been increased or restored. By decrypting the context data, the smart card can make use of the context data and resume its original state.

In a set of embodiments, at least the smart card interface of the device runs in a trusted execution environment. By running in a trusted execution environment, cryptographic hardware may be used to assist in control of a CPU and/or the memory of the device for communication with the smart card. The device may further encrypt/decrypt the smart card data in the trusted execution environment, if required. This further encryption may take place on the device, in order to protect the context data from an individual attempting to access it through the device memory.

In a set of embodiments, the device employs hardware abstraction layer firmware routines. By using hardware abstraction layer (HAL) firmware (FW) routines, the device can be programmed at a high level in order to interface at a low level with the smart card. This allows for simplified development. By using firmware routines, the device programming can be separated into firmware and software, and potentially written and/or loaded onto the device separately.

In a set of embodiments, the smart card selectively delays the sending of context data to the device. If, for example, the smart card is in the middle of an operation or process, the smart card may finish that operation or process before constructing the data packet to send to the device. This allows the smart card to finish and verify any functions that may be urgent or non-interruptible, before fulfilling the request of the device and sending context data to it.

BRIEF DESCRIPTION OF THE DRAWINGS

One or more non-limiting examples will now be described with reference to the accompanying drawings, in which:

FIG. 1 shows a device 100 connected to a Universal Integrated Circuit Card (UICC) 110 in accordance with an embodiment of the present invention. The device could, for example, be an Internet of Things (IoT) device such as a remote environmental sensor. The device comprises a memory 102, a CPU 104 comprising cryptographic hardware 106, and a UICC power supply regulator 108.

Figure 1:
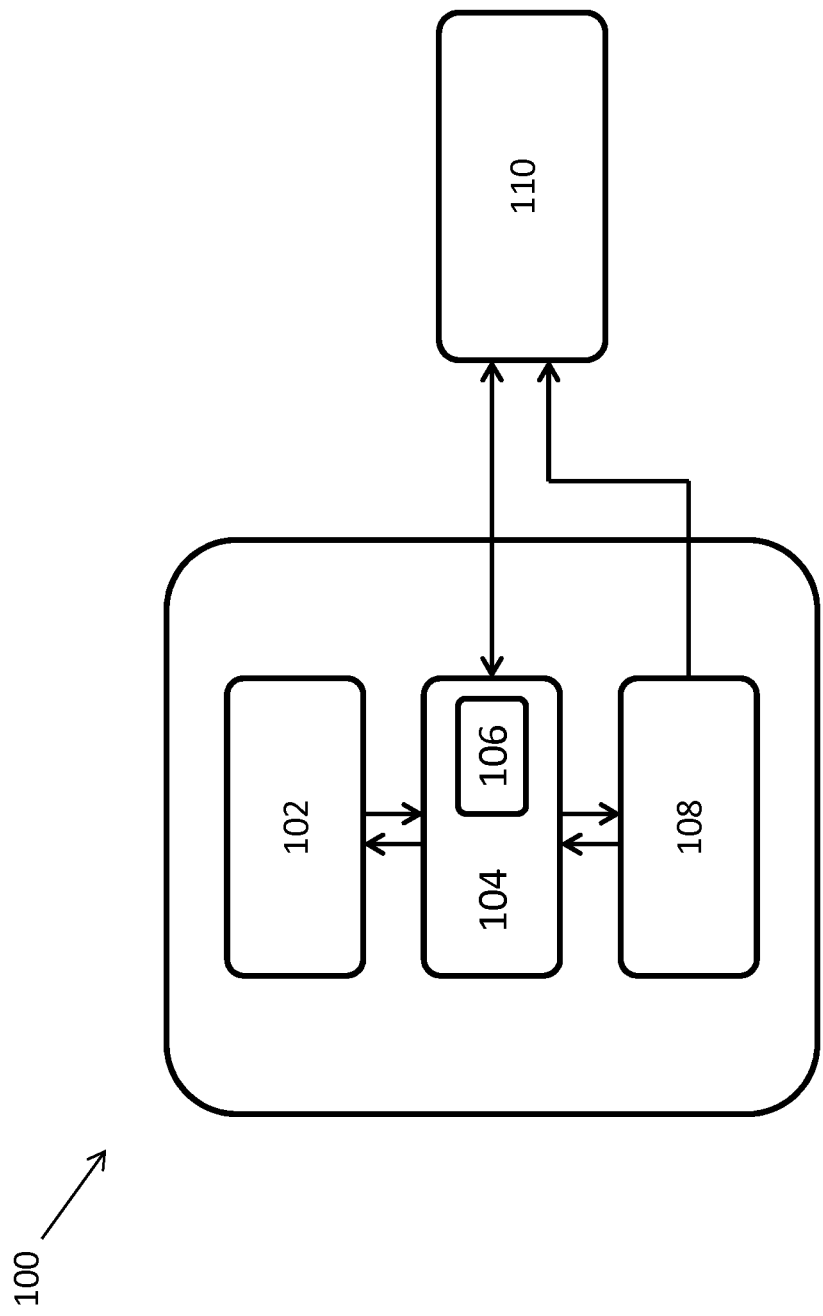
FIG. 1 shows a schematic block diagram of a device connected to a UICC in an embodiment of the invention.

The UICC 110 is a standard smart card that is used in devices that require a cellular data network connection, such as mobile phones or remote sensors. The UICC 110 runs a Subscriber Identification Module (SIM) application, containing the required profiles etc. for establishing communication with a network operator. This can then be used by the CPU 104 for controlling relevant hardware on the device 100 for communication with the network. The UICC 110 is in operable communication with the CPU 104 of the device 100.

The device 100 is one that is connected to a network via, e.g. LTE, 3G, GSM etc. for communication of data. As mentioned above, the device may be, for example, a remote sensor, taking measurements at predetermined intervals, or otherwise a device that is required to transmit/receive data from a mobile network. Between intervals when the device is making measurements/communicating with the network, the device may be configured to enter an (extended) Discontinuous Reception ((e)DRX) or Power Saving Mode (PSM). During these periods, many systems within the device, for example the memory 102 and UICC 110, are powered down in order to reduce power consumption/extend battery life. By reducing or removing power to these systems during (e)DRX/PSM, the device can achieve significant power savings over time. This is especially important in battery powered devices, as the power consumption of these devices directly affects their operational lifetime.

The memory 102 stores instructions and data for the device 100. For example, any sensor measurements made by the device 100 will be stored in the memory 102. The memory 102 is non-volatile, meaning that the power to it can be removed, and the data stored will not be lost. The memory 102 is in operative communication with the CPU 104.

The CPU 104 controls operations on the device by executing instructions stored in the memory 102. As part of a software application, the CPU 104 may be instructed to enter the device into a (e)DRX/PSM mode of operation, when reduced power consumption is required. The SIM application running on the UICC 110 is also able to communicate with the device 100 in order to negotiate a SUSPEND/RESUME operation as is described in further detail below.

In order to communicate with the UICC 110, the device 100 makes use of a trusted execution environment within the CPU 104. This trusted execution environment is assisted by cryptographic hardware 106 inside the CPU 104. In order to communicate with the UICC 110, the CPU runs hardware abstraction layer (HAL) firmware (FW) routines, which adhere to the ISO/IEC 7816-3:2006 standard. This standard interface between the device 100 and the UICC 110 ensures compatibility with a variety of UICCs. Furthermore, the use of cryptographic hardware 106 and a trusted execution environment running on the CPU 104 allow for secure communication between the device 100 and the UICC 110. This can prevent external applications running on the device from accessing secure data, and also prevent attempts by an individual to extract secure data e.g. context data from the device. The cryptographic hardware 106 is used to encrypt/decrypt the UICC data during the SUSPEND/RESUME process, if required.

The UICC power supply 108 controls the power to the UICC 110. In this embodiment, the UICC power supply 108 is integrated within the device 100, e.g. integrated into the device 100 host chip/system on chip (SOC). It is envisaged however, that the UICC power supply 108 may be a discrete regulator component on the device 100 at a board level outside the host chip/SOC, or integrated within a separate power management integrated circuit, on the device at a module board level. During normal operation, the UICC 110 is fully powered. However, as explained in further detail below, during periods of (e)DRX/PSM the UICC power supply 108 is switched off. The UICC power supply 108 is in operative communication with, and is controlled by the CPU 104.

Figure 2:
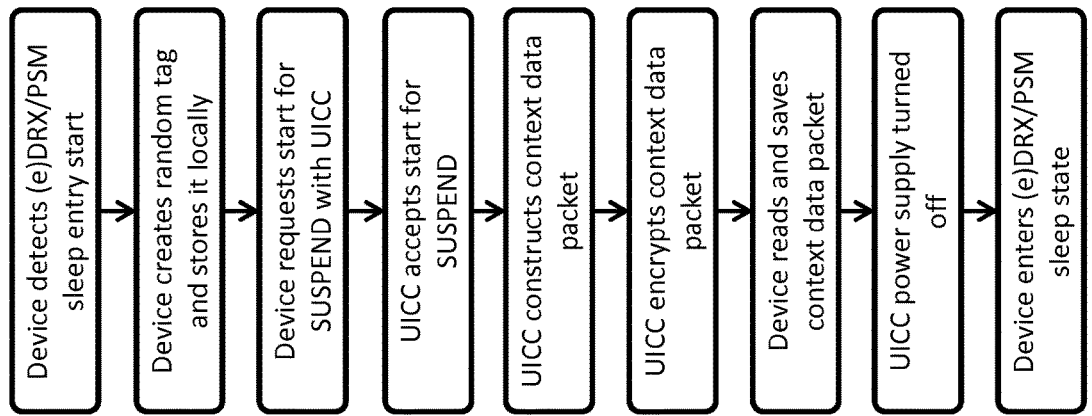
FIG. 2 shows a flowchart of the events associated with a SUSPEND operation in an embodiment of the invention.

Before entering an (e)DRX/PSM, the device 100 communicates with the UICC 110 in order to negotiate a SUSPEND operation. In summary, the SUSPEND operation issued by the CPU 104 informs the UICC 110 that the device is going to enter a period of (e)DRX/PSM, and thus the UICC 110 will lose it's supplied power shortly. In response to the SUSPEND operation, the UICC 110 constructs a context data packet. In accordance with the present invention, this context data packet is sent to the host device 100 for storage in the memory 102, and the UICC power supply 108 is switched off. A full description of a SUSPEND operation can be found below with reference to FIG. 2.

In the first step, the CPU 104 performs an instruction that indicates that the device 100 should enter an (e)DRX/PSM. In response to this instruction, the device 100 also creates a random tag, for example through the cryptographic hardware, for later use in the SUSPEND and RESUME operations. The random tag might be a four digit code e.g. '1234'. The random tag is stored in the memory 102. Typically, the device 100 will create a random tag upon each new (e)DRX/PSM period that it enters.

The device 100 then requests the start of a SUSPEND operation with the UICC 110. This is done through the trusted execution environment, including the cryptographic hardware 106 on the CPU 104. The HAL FW routines are used to request the SUSPEND operation with the UICC, and in this request the random tag previously generated on the device 100 is passed to the UICC 110. If ready, the UICC 110 accepts the start of the SUSPEND operation. It is possible that the UICC 110 may be in the middle of a process or function, and thus delays the acceptance of the SUSPEND operation until it has finished.

The UICC 110 then constructs the context data packet. This context data packet contains both context data and resume information. Specifically, context data might include at least one of the following: the status of selected Network Access Applications (NAAs) on each logical channel, security conditions for each NAA, selected Elementary Files (EFs) and record for each logical channel, and status of toolkit applications. Resume information is information that is used by the UICC 110 upon reinitialisation during a RESUME operation. The constructed context data packet is then encrypted using the random tag that was passed to the UICC 110 with the SUSPEND request. The UICC 110 then calculates a Hash Message Authentication Code (HMAC) of the encrypted data packet using an internal secret key and writes it to the UICC non-volatile memory.

The encrypted context data packet is then sent to the device 100. The device 100 reads the encrypted context data packet and stores it in the memory 102. As the sending of the context data packet signals that the UICC is ready to be turned off, the device 100 then switches off the power to the UICC 110 via the UICC power supply 108. The UICC 110 thus consumes no power in this state, saving power and increasing the battery lifetime of the device 100. The device 100 then enters an (e)DRX/PSM. During this mode, further power savings are achieved.

Figure 3:
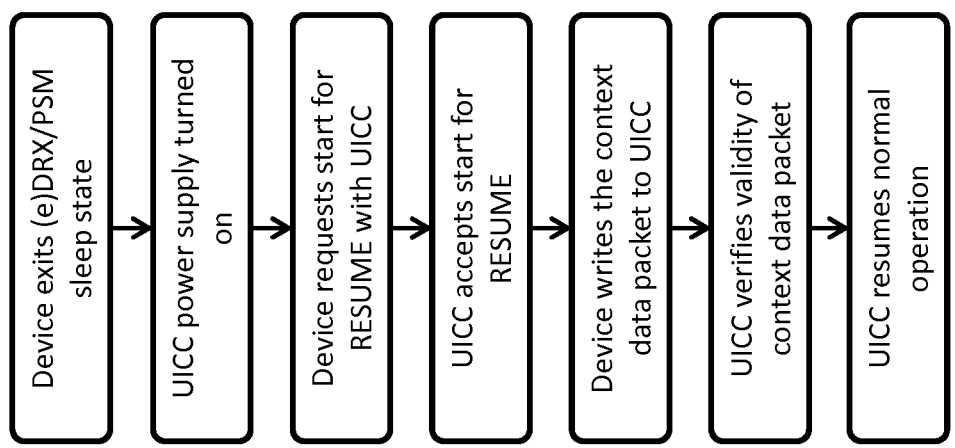
FIG. 3 shows a flowchart of the events associated with a RESUME operation in an embodiment of the invention.

Upon exit of an (e)DRX/PSM, the device 100 reapplies power to the UICC 110 via the UICC power supply 108. A RESUME operation is then carried out on the CPU 104. In summary, the RESUME operation reinitialises the UICC 110 after a period where it was not powered. The RESUME operation involves writing the context data to the UICC 110 that was previously stored in the memory 102. A full description of a RESUME operation can be seen below with reference to FIG. 3.

To begin, the device exits the (e)DRX/PSM state in order to, for example, transmit data to the network, make a measurement, or to check for any messages. This involves the powering up of systems that were put into a sleep state/not powered during the (e)DRX/PSM period, such as the UICC 110. This is done by the CPU 104 activating the UICC power supply 108 to turn on the UICC 110.

The device 100 then requests the start of a RESUME operation with the UICC 110. If ready, the UICC 110 accepts the start of the RESUME operation. It is possible that the UICC 110 can delay sending this acceptance, for example if it has not finished performing all of its start-up procedures. Once the RESUME operation has been accepted, the device 100 retrieves the encrypted context data packet from the memory 102 and writes it to the UICC 110. The random tag that was previously generated is also sent to the UICC 110 with the encrypted context data packet.

Once received, the UICC 110 verifies the validity of the encrypted context data packet, for example by calculating a HMAC of the received packet using the same internal secret key as before, and comparing it with the stored HMAC. The validation step also includes decrypting the encrypted context data packet using the random tag received from the device 100. Once decrypted, the UICC 110 can use the resume information, together with the context data to reinitialise and assume the state that it was in before the SUSPEND operation was accepted. This means that the UICC 110 resumes normal operation, allowing the device 100 to make use of the SIM application running on the UICC 110, and communicate with the network.

Thus it will be seen that an electronic device and an associated method have been described that can reduce or remove power to a smart card connected to the device during periods of desired low power consumption. It will be appreciated that the embodiments described herein are merely exemplary and are not limiting on the scope of the invention. An environmental sensor has been described but it is envisioned that the device may be, for example, a mobile phone, wireless sensor or an otherwise cellular data network connected device. Although a particular embodiment has been described in detail, it will be appreciated by those skilled in the art that many variations and modifications are possible using the principles of the invention set out herein.

The invention claimed is:

1. A method of controlling an electronic device comprising a memory and a removable smart card connected thereto, the method comprising:
    the device sending a request for context data to the smart card;
    the smart card sending context data comprising current state information of the smart card to the device in response to the request;
    storing the received context data in the memory;
    reducing or removing power to the smart card; and
    subsequently increasing or restoring power to the smart card and writing the context data back to the smart card;
    wherein the method further comprises the smart card encrypting the context data before sending it to the device.

2. The method as claimed in claim 1, wherein the smart card is a Universal Integrated Circuit Card.

3. The method as claimed in claim 1, wherein the smart card runs a Subscriber Identification Module application.

4. The method as claimed in claim 1, wherein said memory is non-volatile memory.

5. The method as claimed in claim 1, wherein the method further comprises the device going into a sleep mode after reducing or removing power to the smart card.

6. The method as claimed in claim 1, wherein the device creates a random tag that is used in said encryption.

7. The method as claimed in claim 1, wherein the smart card calculates a Hash Message Authentication Code of the context data.

8. The method as claimed in claim 6, wherein the smart card verifies the validity of the context data written back to it after power has been increased or restored.

9. The method as claimed in claim 1, wherein the smart card decrypts the context data written back to it after power has been increased or restored.

10. The method as claimed in claim 1, wherein at least the smart card interface of the device runs in a trusted execution environment.

11. The method as claimed in claim 1, wherein the device executes the method with hardware abstraction layer firmware routines.

12. The method as claimed in claim 1, wherein the smart card selectively delays the sending of context data to the device.

13. An electronic device comprising a memory and a removable smart card connected thereto, the device being arranged to:
- send a request for context data to the smart card;
- receive context data comprising current state information of the smart card from the smart card in response to the request, wherein the context data is encrypted by the smart card;
- store the received context data in the memory;
- reduce or remove power to the smart card; and
- subsequently increase or restore power to the smart card and write the context data back to the smart card.

14. An electronic device comprising a memory, and being adapted to receive a smart card, the device being arranged in use to:
- send a request for context data to the smart card;
- receive context data comprising current state information of the smart card in response to the request, wherein the context data is encrypted by the smart card;
- store the received context data in the memory;
- reduce or remove power to the smart card; and
- subsequently increase or restore power to the smart card and write the context data back to the smart card.

15. A non-transitory computer readable medium comprising software for execution on an electronic device comprising a memory and a removable smartcard connected thereto, the software comprising instructions to:
- send a request for context data to the smart card;
- receive context data comprising current state information of the smart card from the smart card in response to the request, wherein the context data is encrypted by the smart card;
- store the received context data in the memory;
- reduce or remove power to the smart card; and
- subsequently increase or restore power to the smart card and write the context data back to the smart card.

* * * * *